US012671642B2

(12) United States Patent
Goparaju et al.

(10) Patent No.: US 12,671,642 B2
(45) Date of Patent: Jun. 30, 2026

(54) REGENERATION OF A STATE TIMELINE OF A DEVICE BASED ON AGGREGATION OF DATA MESSAGES

(71) Applicant: Hewlett Packard Enterprise Development LP, Spring, TX (US)

(72) Inventors: Uttej Goparaju, Bangalore (IN); Sharan Chaitanya Potturu, Bangalore (IN); Dheeraj Dinesh Bapat, Bangalore (IN); Ashish Prabhakar, Bangalore (IN); Tathagata Roy, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 218 days.

(21) Appl. No.: 18/596,897

(22) Filed: Mar. 6, 2024

(65) Prior Publication Data

US 2025/0193097 A1 Jun. 12, 2025

(30) Foreign Application Priority Data

Dec. 8, 2023 (IN) .............................. 202341083891

(51) Int. Cl.
*H04L 43/067* (2022.01)
*H04L 43/028* (2022.01)
*H04L 67/568* (2022.01)

(52) U.S. Cl.
CPC .......... *H04L 43/067* (2013.01); *H04L 43/028* (2013.01); *H04L 67/568* (2022.05)

(58) Field of Classification Search
CPC ... H04L 43/067; H04L 43/028; H04L 67/568; H04L 43/02; H04L 43/026; H04L 43/04
See application file for complete search history.

(56) References Cited

U.S. PATENT DOCUMENTS

| | | | | |
|---|---|---|---|---|
| 6,546,420 B1 * | 4/2003 | Lemler | ................... | H04L 69/16 |
| | | | | 709/224 |
| 8,743,712 B1 * | 6/2014 | Herzi | .................... | H04L 41/046 |
| | | | | 370/252 |
| 2005/0010660 A1 * | 1/2005 | Vaught | .................... | H04L 43/00 |
| | | | | 370/400 |
| 2008/0151757 A1 * | 6/2008 | Matsubara | ............ | H04L 43/026 |
| | | | | 370/237 |
| 2011/0026521 A1 * | 2/2011 | Gamage | .............. | H04L 45/3065 |
| | | | | 370/389 |
| 2013/0346533 A1 * | 12/2013 | Agrawal | ............. | H04L 67/1095 |
| | | | | 709/213 |
| 2015/0271285 A1 * | 9/2015 | Hindawi | ............... | H04L 67/568 |
| | | | | 709/213 |

(Continued)

*Primary Examiner* — Johnny B Aguiar

(74) *Attorney, Agent, or Firm* — Hewlett Packard Enterprise Patent Department

(57) ABSTRACT

In certain embodiments, a computer-implemented method includes aggregating data messages related to a device that are transmitted over a network within a defined aggregation period into a single data message; comparing the single data message to previously-aggregated data from a preceding aggregation period stored in a data store to determine whether the single data message differs from the previously-aggregated data; storing, in response to determining that the single data message differs from the previously-aggregated data, the single data message to the data store; and regenerating a state timeline of the device using the stored data in the data store.

18 Claims, 8 Drawing Sheets

(56)                References Cited

U.S. PATENT DOCUMENTS

| | | | |
|---|---|---|---|
| 2021/0240711 A1* | 8/2021 | Coleman ............. | G06F 16/2365 |
| 2023/0239226 A1* | 7/2023 | Liu ...................... | H04L 43/045 |
| | | | 709/224 |

* cited by examiner

100

Network 160

User Interface
180

Regeneration
Module A4

Aggregation
Module A1

Change
Detection
Module A2

Middle Layer
Cache
Module A3

Storage 120

Application
Server 140

Backend
110

300

310 — Aggregate data messages related to a device that are transmitted over a network within a defined aggregation period into a single data message 320 — Compare the single data message to previously-aggregated data from a preceding aggregation period stored in a data store to determine whether the single data message differs from the previously-aggregated data 330 — Store, in response to determining that the single data message differs from the previously-aggregated data, the single data message to the data store 340 — Delegate a request from a client to the device to retrieve data from the data store at a specific date and time in the past, or within a specific time frame in the past 350 — Regenerate a state timeline of the device using the stored data in the data store 360 — Present the regenerated state timeline of the device through a user interface

510 Start

512 Is timestamp of data within aggregation window ?

524 Drop message

526 End

514 Pass aggregation function on input data and store temporary result in cache

516 Aggregation time window closed ?

518 Forward aggregated output downstream

520 Clear cache

522 End

Yes

No

REGENERATION OF A STATE TIMELINE OF A DEVICE BASED ON AGGREGATION OF DATA MESSAGES

BACKGROUND

A network application is a software application that utilizes a network to perform application functions. The network application may leverage network protocols to communicate and share data between or among devices connected to the network. The network may include resources connected by communication links, and may be used to connect devices, provide services (e.g., internally and/or externally via the internet and/or an intranet), and/or organize information, among other activities. The network may include a variety of network devices, such as access points, controllers, gateways, switches, etc., which perform different network operations, such as network access, authentication, and routing network traffic to provide connectivity. A network management system (NMS) may be used to maintain and secure the network. For example, the NMS may provide functionality for managing network nodes. The NMS may collect data from, and provide a central point of control for the network nodes.

BRIEF DESCRIPTION OF THE DRAWINGS

For a more complete understanding of this disclosure, and advantages thereof, reference is now made to the following descriptions taken in conjunction with the accompanying drawings, in which:

FIG. 3 illustrates an example method for data storage and associated state regeneration using the sub-system of the NMS, according to certain embodiments;

DETAILED DESCRIPTION

Figure 1:
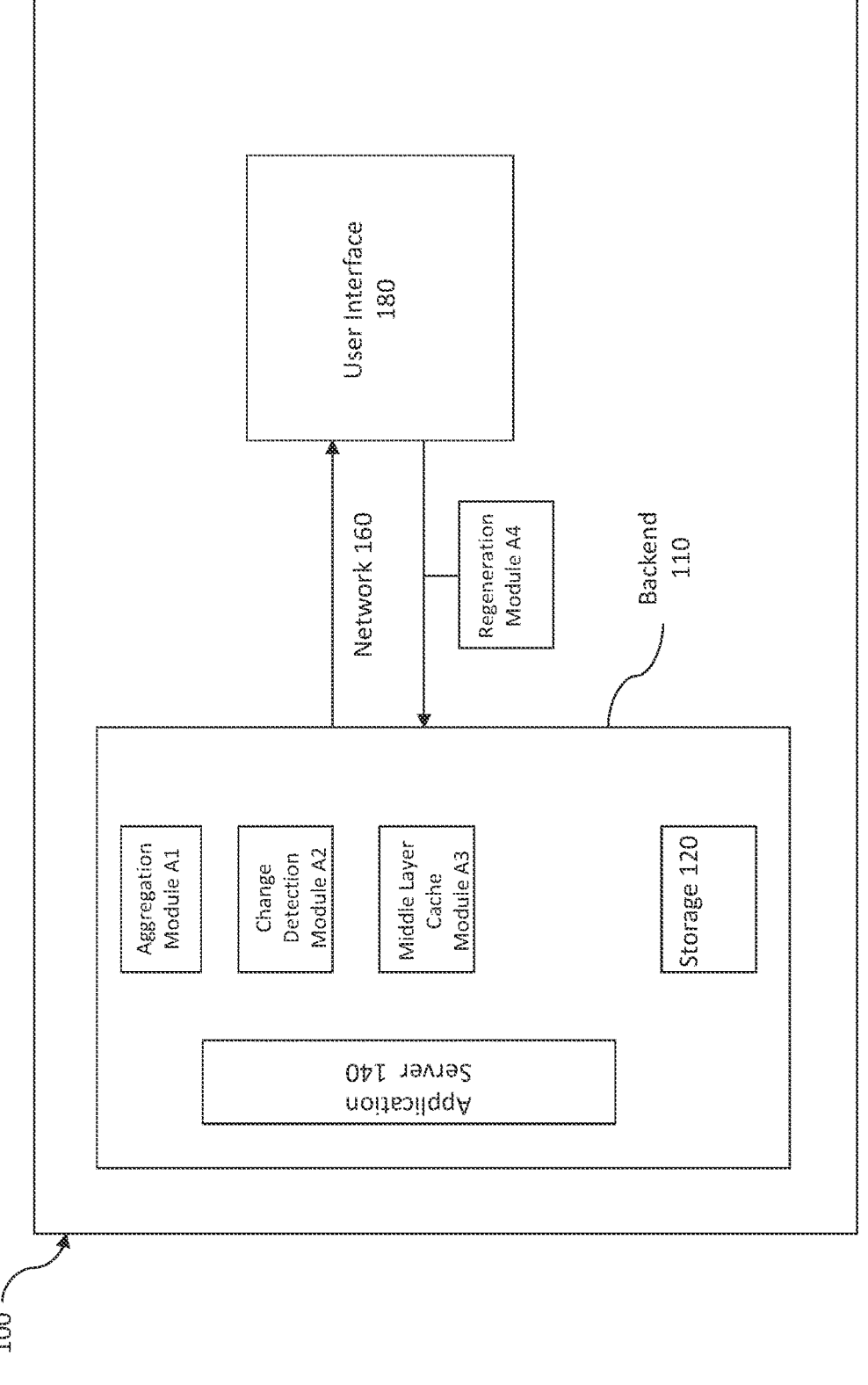
FIG. 1 illustrates an example sub-system of a network management system (NMS), according to certain embodiments.

A large-scale network application may utilize the large-scale network to perform its functions. Large-scale network applications are software applications or programs, and may involve a substantial number of users, devices, or network nodes. Large-scale network applications are built to handle significant volumes of data, traffic, and interactions in a scalable manner. It may be desirable for NMSs to process and store this data in a cost-effective way. It may be advantageous for a NMS of a large-scale network application to allow a network administrator to view both historical and real-time data to help identify and troubleshoot network issues that may have occurred at potentially any time, past or present. Particularly with massive volumes of data that may be generated, doing so may be expensive and/or impractical, both in terms of storage and processing overhead.

For example, consider a network having N devices publishing Y data messages of size K for every T time unit. The quantity of data messages may be calculated as $N \times Y \times K \times T$. To monitor and build a data timeline for this network for seven days, the total volume of data may be $V = N \times Y \times K \times (7*24*60)$, where $T = 1$ minute. In certain scenarios, N and Y are configurable while K and T are variable. As a particular example, if a network includes 3 million clients ($N = 3 \times 10^6$) and $Y = 1$ and $K = 1$, then V may be 30 billion client data messages to construct a time machine for that network. To provide this capability for a large-scale network application, the huge volumes of data to be handled and stored result in higher data storage costs, higher processing costs and requirements, greater input/output operations per second (IOPS) requirements, and possible degradation of user interface (UI) experience.

Certain embodiments of this disclosure provide a multi-step optimized solution to handle huge volumes of data of a large-scale network effectively, allowing a NMS to provide a so-called networking time machine that allows a network administrator to view historical and real-time data as well as performance metrics at different points in time. This capability may allow a network administrator or other user to select any specific time (e.g., date, time, and/or other suitable granularity) in the past to analyze network performance and statistics. Additionally or alternatively, this capability may allow a network administrator to troubleshoot past or current network issues, as well as track network behavior over time. The large-scale network may be used by a large-scale network application to perform its functions.

In certain embodiments, a method to provide for data storage and associated state regeneration includes performing an aggregation of data over time for every client (e.g., a device, or the like) across the network, in order to convert non-deterministic data into deterministic data. For example, an aggregation module can aggregate multiple (and potentially all) data messages relating to a respective device that are transmitted over the network within a defined aggregation period into a single data message. The method may include comparing the aggregated data (e.g., the single data message) received from the aggregation module to previously stored data in a data store, the stored data being related the respective device. For example, this may be performed by a change detection module that uses a comparator to compare stored data in the data store from a preceding aggregation period to the single data message from the aggregation module. In certain embodiments, the new data (e.g., the single data message) may be published to the data store if (and possibly only if) the new data may be different from the stored data already in the data store. These techniques may reduce the volume of data that stored, and may reduce amount of data to be transmitted within the network.

The method may include using a middle layer cache module (e.g., a federation layer) to delegate requests (e.g., from a client to the device) to retrieve data at a specific time (e.g., at a specific date and time in the past, or during a specific time frame in the past). The middle layer cache module may include a cache in which responses for past requests are stored. The stored responses in the cache can serve as both a superset and subset for subsequent requests. In this way, the stored data in the cache of the middle layer cache module can be reused if a date and time of a subsequent request to retrieve data may be the same as the date and time of a previously fulfilled request to retrieve data from the device. In addition, the stored data in the cache of the middle layer cache module can be reused if a time frame of a subsequent request to retrieve data may be fully within or partially within the time frame of a previously fulfilled request to retrieve data from the device. As a result, the amount of data that needs to be retrieved from the device during the subsequent request may be reduced since some of the requested data is already stored in the cache of the middle layer cache module. This may improve response times and provide better system performance. The method may include regenerating some and potentially all of a state timeline using the reduced volume of data in the data store in response to a user request. This may involve using the existing data points of the reduced volume of data stored in the data store to repopulate and fill potentially the entire data spectrum in a timeline that is specified by the user's request, so as to show the existing data points during state changes, as well as additional regenerated data points between each state change and a subsequent state change. This may allow the possibility to bridge the some, and possible the entire, spectrum of data in the timeline requested by the user, while reducing or eliminating the possibility of data loss. In certain embodiments, this regeneration operation may be performed using a regeneration module, and may be performed on the client-side of the network. Certain embodiments may provide advantages by reducing the volumes of data to be handled and stored, which may result in a reduction of data storage costs. Additionally or alternatively, the smaller amount of data to be transmitted improve data transfer speeds and user interface (UI) responsiveness.

FIG. 1 illustrates an example sub-system 100 of a NMS, according to certain embodiments. The NMS may be used to maintain a large-scale network. In certain embodiments, the sub-system 100 may be used to provide a networking time machine for the large-scale network, and a large-scale network application may utilize the large-scale network to perform application functions. A server may be used to support and operate the sub-system 100. For example, the server hosts the backend components and supports the functionality of the sub-system 100. In the illustrated example, the sub-system 100 may include a backend 110 that runs on the server, and which may be collectively responsible for handling data processing, logic, and communications with databases (e.g., a storage 120). The backend 110 may include the storage 120, which may be a mechanism and infrastructure that is used to store and retrieve data. The storage 120 can take various forms. For example, the storage 120 may include a data store, a database server, or the like.

The backend 110 may include a number of modules, which are discrete components or functional units of the large-scale network application that perform specific tasks. These modules are often implemented as separate entities, and each module may be responsible for a specific set of tasks or features. As an example, the backend 110 of the sub-system 100 may include an aggregation module A1 that can be tasked with aggregating data messages for a device over time, in order to convert non-deterministic data into deterministic data. The backend 110 of the sub-system 100 may include a change detection module A2, which can be tasked with comparing aggregated data messages from the aggregation module A1 to the most recently stored data in the storage 120. The backend 110 of the sub-system 100 may include a middle layer cache module A3 that can be used to delegate requests (e.g., from a client to the device) through an applicable backend service. The sub-system 100 may also include a regeneration module A4 that is not located in the backend 110 but is instead positioned at the edge of the network (e.g., a client-side of the network). The regeneration module A4 may be used to regenerate some and potentially all of a state timeline using the stored data in the storage 120 in response to a user request.

The backend 110 may include an application server 140. The application server 140 may have one or more processors that are responsible for executing computations and processing tasks associated with running the large-scale network application's logic and handling user requests. For example, the application server 140 may coordinate the processing of requests, execute logic, and manage the flow of data between a user interface (UI) 180 and the modules of the backend 110.

The sub-system 100 may include the user interface (UI) 180 on the client side (e.g., a web browser, or the like) that may be responsible for rendering the user interface elements and handling user interactions. This may include processing user inputs, managing the display of content, and initiating requests to the backend 110. In an embodiment, the large scale network (e.g., a network 160) may host the backend 110 and facilitate communication between the UI 180 and the backend 110 of the large-scale network application.

Figure 2:
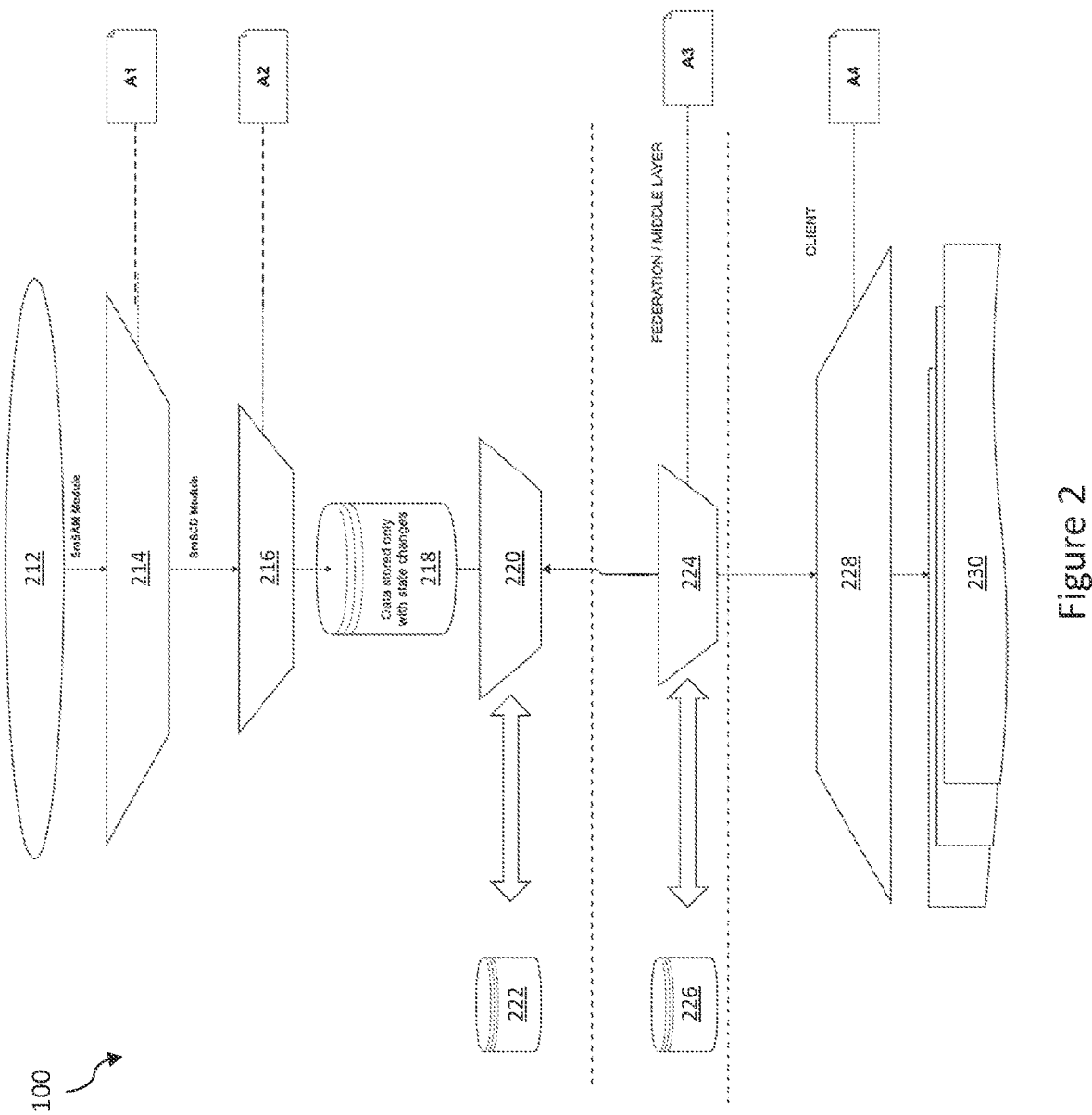
FIG. 2 illustrates a diagram of the sub-system of the NMS, and an associated method for data storage and associated state regeneration for a large-scale network, according to certain embodiments.

FIG. 2 illustrates a diagram of the sub-system 100 and an associated method for data storage and associated state regeneration for the large-scale network, according to certain embodiments. The NMS that is used to maintain the large-scale network includes the sub-system 100. The sub-system 100 and the associated method is described in the context of being applied to an example first client (e.g., a device, an application, or the like) of the large-scale network. However, in certain embodiments, a respective sub-system 100 and the associated method may be applied across more than one client of the large-scale network. In certain embodiments, a respective sub-system 100 and the associated method may be applied across each client of the large-scale network.

Referring further to FIG. 2, a step 212 of the method is shown in which all data messages transmitted by a first client of the large-scale network over a first time period are sent to the aggregation module A1 of the sub-system 100. The first time period can be any specified duration of time (e.g., a week, or the like) which can be defined by network policy. In certain embodiments, the first time period can be determined using an algorithm. The first client of the large-scale network may be, for example, a first device (e.g., an access point, controller, gateway, switch, or the like). The aggregation module A1 may also be referred to subsequently as a smart state aggregation module (SmSAM) and is described in more detail subsequently in FIGS. 4 through 6.

Once all the data messages from the first client of the large-scale network over the first period of time have been received by the aggregation module A1, the aggregation module A1 performs a step 214 of the method. The step 214 is an aggregation of the data messages over time for the first client (e.g., the first device, or the like) in order to convert non-deterministic data into deterministic data. For example, to perform the aggregation, the aggregation module A1 divides the first time period into smaller but equal time intervals referred to as aggregation periods. Each aggregation period can be any specified duration of time (e.g., 5 minutes, or the like) which can be defined by network policy. Alternatively, each aggregation period can be any specified duration of time that is determined by a suitable algorithm. The aggregation module A1 then aggregates all the data messages relating to the first client that are transmitted over the network within each of the aggregation periods into a single respective aggregated data message. As a result, in an example, the number of aggregated data messages may be reduced to be equal to the number of aggregation periods.

At step 216, each of the aggregated data messages from the aggregation module A1 may be forwarded to the change detection module A2. The change detection module A2 may also be referred to subsequently as a smart state change detection module (SmSCD) and is described in more detail subsequently in FIGS. 7 and 8. Further, in step 216, the change detection module A2 compares each aggregated data message received from the aggregation module A1 to the most recently stored data in a data store 218. The data store 218 may be a database server, hard drive, or the like. The most recently stored data may be from a previous aggregation period as compared to the aggregation period of the aggregated data message to which it is being compared. For example, this comparison may be performed by the change detection module A2 using a comparator to compare the most recently stored data in the data store 218 that is from a preceding aggregation period to the aggregated data message from the aggregation module A1. The aggregated data message from the aggregation period that is currently being compared is published (also referred to as stored) to the data store 218 if the aggregated data message is different from the stored data already in the data store 218, or if there is no data present in the data store 218. Advantages may be provided by performing the step 214 using the aggregation module A1, and by performing the step 216 using the change detection module A2. These advantages include a reduction in the volume of data that needs to be stored in the data store 218, and therefore a reduction in the amount of data that need to be transmitted within the large-scale network.

The method allows for the retrieval of the stored data in the data store 218 by any relevant backend service. For example, in a step 220 of the method, the backend service will retrieve the stored data in the data store 218 when the backend service receives a request from a client (e.g., a software application or program that requests data resources) to retrieve or manipulate data. The request to retrieve data may be sent to the backend service through the middle layer cache module A3 (which will be described in detail subsequently). The backend service may store the response (e.g., the retrieved data) to the request from the client in a cache 222, so that similar requests from the client in the future are responded to by retrieving the data stored in the cache 222, rather than by retrieving the data stored in the data store 218. The use of the cache 222 by the backend service allows the efficient storage and retrieval of data, which reduces the time and resources needed to retrieve previously used and requested data.

The method allows for the delegation of requests to retrieve stored data from the data store 218. For example, in a step 224 of the method, the middle layer cache module A3 (e.g., a federation layer or a middle layer) may be used to delegate requests (e.g., from the client to the first device)

through the applicable backend service to retrieve data from the data store 218 at a specific time (e.g., at a specific date and time in the past, or during a specific time frame in the past). The middle layer cache module A3 may be an intermediate component or software layer within the sub-system 100 that facilitates communication and coordination between different modules and services of the sub-system 100. The middle layer cache module A3 may include a cache 226 where responses for past requests are stored. The stored responses in the cache 226 can serve as both a superset and subset for subsequent requests. In this way, the stored data in the cache 226 of the middle layer cache module A3 can be reused if a date and time of a subsequent request to retrieve data may be the same as the date and time of a previously fulfilled request to retrieve data from the data store 218. In addition, the stored data in the cache 226 of the middle layer cache module A3 can be reused if a time frame of a subsequent request to retrieve data is fully within or partially within the time frame of a previously fulfilled request to retrieve data from the data store 218. Advantages may be provided by reusing the stored data in the cache 226 of the middle layer cache module A3 that is from a previously fulfilled request. These advantages include a reduction in the amount of data needed to be retrieved from the data store 218 during the subsequent request to retrieve data. The capability to retrieve some or all of the requested data from the cache 226 of the middle layer cache module A3 rather than the data store 218 may improve response times and system performance.

The method may allow for the regeneration of some, and potentially all, of a state timeline using the stored data in the data store 218, and/or the caches 222 and 226. For example, in a step 228 of the method, some, and potentially all, of a state timeline is regenerated using the stored data in the data store 218, and/or the caches 222 and 226, in response to a user request to retrieve data relating to the first device from a specific time or that falls within a specific time frame in the past. This involves using first data points of the data stored in the data store 218 and/or the caches 222 and 226 to repopulate and fill the entire data spectrum in a timeline (e.g., the specific time frame in the past) that is specified by the user's request. The first data points of the data stored in the data store 218 and/or the caches 222 and 226 can also be used to repopulate a data point in the data spectrum that corresponds to a specific time in the past that is specified by the user's request. In this way, the entire data spectrum of the timeline specified by the user's request shows the first data points that were stored in the data store 218 during state changes, as well as second regenerated data points between each state change and a subsequent state change. The step 228 may be performed using a regeneration module A4, and this regeneration may be performed on the client-side of the large-scale network close to the edge of the large-scale network. Advantages can be provided by using the regeneration module A4 to perform the step 228 to regenerate some, and potentially all, of a state timeline using the stored data in the data store 218, and/or the caches 222 and 226, wherein this regeneration may be performed on the client-side of the large-scale network close to the edge of the large-scale network. These advantages include making it possible to bridge the entire spectrum of data in the timeline requested by the user, thereby reducing or eliminating the possibility of data loss. In addition, processing the data at the edge of the large-scale network rather than within a centralized network node (e.g., a server) results in a possible reduction of latency issues and an improvement in user interface (UI) responsiveness.

The method allows for the presentation of information to users in a visually understandable format. For example, in a step 230 of the method, the state timeline that was regenerated in the step 228 of the method is displayed through the UI 180 (shown previously in FIG. 1) of the client application (e.g., through a web browser, or the like). A complete data spectrum in the timeline (e.g., the specific time frame in the past) that is specified by the user's request may be shown with little or no information loss or compromise to user experience. In certain embodiments, a data point corresponding to a specific time and date in the past that is specified by the user's request can also be shown with no information loss or compromise to user experience. In this way, the sub-system 100 and the associated method described in FIG. 2 provide a networking time machine that allows a network administrator to view historical and real-time data of the large-scale network as well as performance metrics of the large-scale network at different points in time. The network administrator can select any specific date and time in the past or a specific time frame in the past, to analyze network performance and statistics, and this can be used to troubleshoot past or current network issues, as well as track network behavior over time.

FIG. 3 illustrates an example method 300 for data storage and associated state regeneration using the sub-system 100 (described previously in FIGS. 1 and 2) of a NMS, according to certain embodiments. The method 300 allows a network administrator to view both historical and real-time data to help identify and troubleshoot network issues at any time.

In step 310, data messages related to a device that are transmitted over a network within a defined aggregation period may be aggregated into a single data message. For example, the aggregation module A1 may be used to aggregate data messages that are related to the first device that are transmitted over a network within a defined aggregation period into a single data message. The defined aggregation period can be any specified duration of time (e.g., 5 minutes, or the like) which can be defined by network policy. In certain embodiments, the aggregation period can be determined using an algorithm.

In step 320, the single data message may be compared to previously-aggregated data from a preceding aggregation period stored in the data store to determine whether the single data message differs from the previously-aggregated data. For example, the change detection module A2 may be used to compare the aggregated single data message received from the aggregation module A1 to the most recently stored data in the data store 218. This comparison may be performed by the change detection module A2 using a comparator to compare the most recently stored data in the data store 218 that is from a preceding aggregation period to the aggregated single data message from the aggregation module A1.

In step 330, in response to determining that the single data message differs from the previously-aggregated data, the single data message may be stored to the data store. For example, the aggregated single data message may be published (also referred to as stored) to the data store 218 if the aggregated single data message is different from the stored data already in the data store 218, or if there is no data present in the data store 218.

In step 340, a request may be delegated from a client to the device to retrieve data from the data store at a specific time (e.g., at a specific date and time in the past, or during a specific time frame in the past). For example, the middle layer cache module A3 (e.g., the federation layer) may be used to delegate requests from the client (in response to a user request to retrieve data) to the first device through the applicable backend service to retrieve data from the data store 218 at a specific date and time in the past, or during a specific time frame in the past. The middle layer cache module A3 may include a cache 226 where responses for past requests are stored. The stored responses in the cache 226 can serve as both a superset and subset for subsequent requests.

In step 350, a state timeline of the device may be regenerated using the stored data in the data store. For example, some, and potentially all, of a state timeline may be regenerated using the stored data in the data store 218, and/or the caches 222 and 226, in response to the user request to retrieve data relating to the first device from a specific time or that falls within a specific time frame in the past. This involves using first data points of the data stored in the data store 218 and/or the caches 222 and 226 to repopulate and fill the entire data spectrum in a timeline (e.g., the specific time frame in the past) that is specified by the user's request. The first data points of the data stored in the data store 218 and/or the caches 222 and 226 can also be used to repopulate a data point in the data spectrum that corresponds to a specific time in the past that is specified by the user's request. In this way, the entire data spectrum of the timeline specified by the user's request shows the first data points that were stored in the data store 218 during state changes, as well as second regenerated data points between each state change and a subsequent state change. The state timeline of the first device may be regenerated using a regeneration module A4, and this regeneration may be performed on the client-side of the large-scale network close to the edge of the large-scale network.

In step 360, the regenerated state timeline of the device may be presented through a user interface (UI). For example, the state timeline that was regenerated using the stored data in the data store 218, and/or the caches 222 and 226 may be displayed through the UI 180 (shown previously in FIG. 1) of the client application (e.g., through a web browser, or the like) in a visually understandable format.

Figure 4:
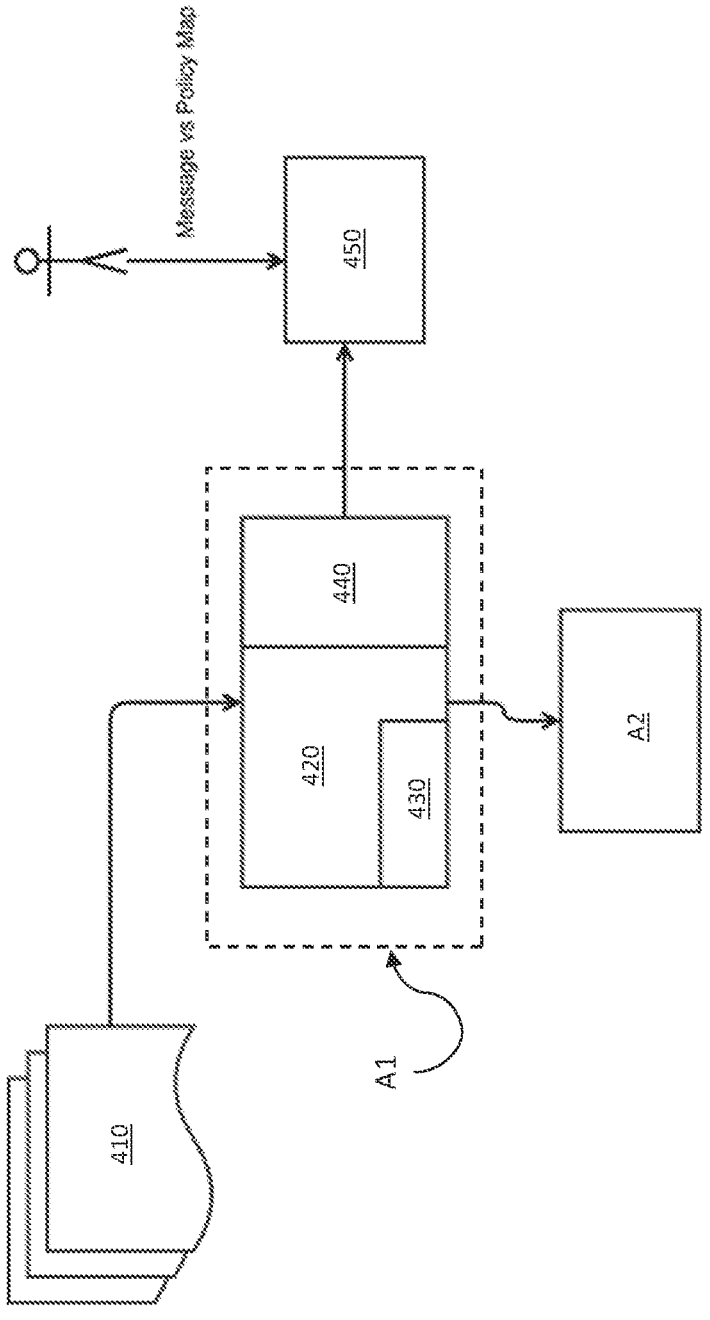
FIG. 4 illustrates a block diagram of an aggregation module of the sub-system of the NMS, according to certain embodiments.
Figure 5:
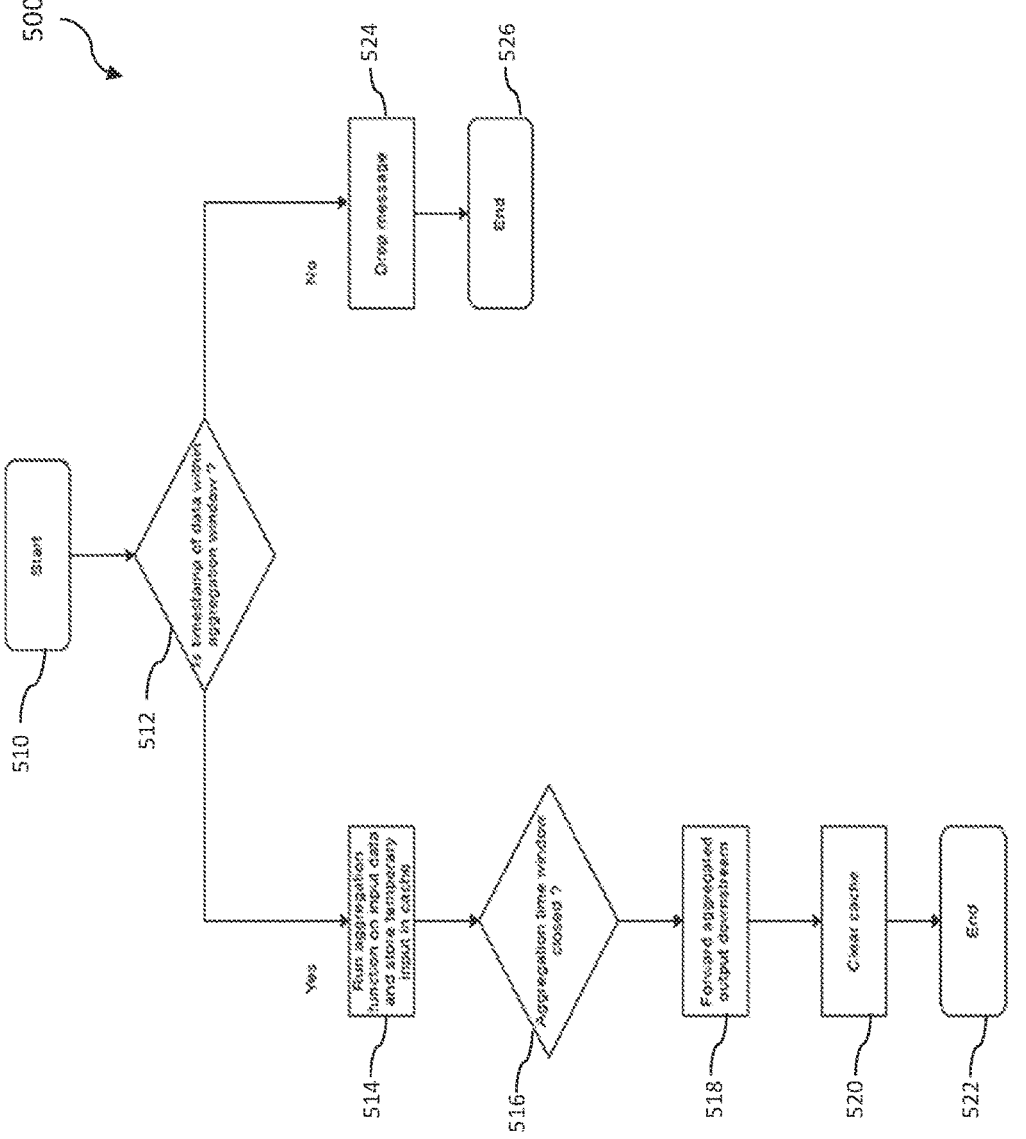
FIG. 5 illustrates a flowchart for an aggregation process performed by the aggregation module of the sub-system of the NMS, according to certain embodiments.
Figure 6:
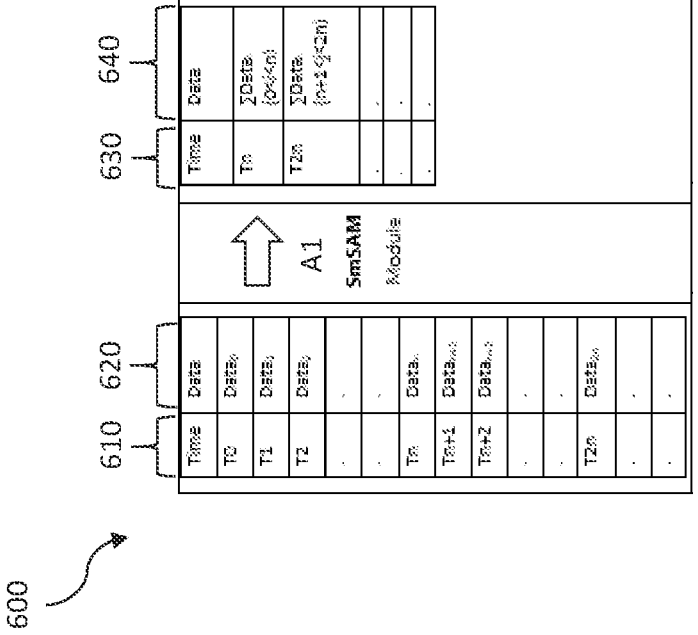
FIG. 6 illustrates a tabular view of the aggregation process performed by the aggregation module of the sub-system of the NMS, according to certain embodiments.

FIG. 4 illustrates a block diagram of the aggregation module A1 of the sub-system 100 that was described previously in FIGS. 1 through 3, according to certain embodiments. FIG. 5 illustrates a flowchart 500 for an aggregation process performed by the aggregation module A1 to aggregate data messages over time for the first client (e.g., the first device, application, or the like) in order to convert non-deterministic data into deterministic data. FIG. 6 illustrates a tabular view of the aggregation process performed by the aggregation module A1 that is described in FIGS. 4 and 5. In FIG. 4, the aggregation module A1 is described in the context of being applied to the first device of the large-scale network. In certain embodiments, a respective aggregation module A1 may be applied to more than one client (e.g., devices, or the like) or network element of the large-scale network. The aggregation module A1 may also be referred to subsequently as a smart state aggregation module (Sm-SAM), and may include a core module 420 that may be responsible for data processing logic and coordination of various tasks. The core module 420 may interact with other modules of the sub-system 100 to ensure the smooth operation of the large-scale network. The aggregation module A1 may include a state store 430 that manages the state or status information of the first device. This can include information about the current configuration, operational status, and other relevant data. The aggregation module A1 may also include a policy checker 440 that may be responsible for enforcing and evaluating network policies. Network policies are defined rules and guidelines for how data should be handled, routed, or processed within the network. The network policies can be defined by a network administrator and may be stored in a policy store 450. In certain embodiments, the network policies in the policy store 450 may be configured without the need to restart the first device, leading to a reduction of downtime during network policy changes. In addition, network policies can be defined in the policy store 450 to allow the aggregation module A1 to apply penalties on the first device, depending on the state of the first device.

Data messages 410 related to the first device may be received by the aggregation module A1. Each of the data messages 410 will have a corresponding time stamp associated with it. The aggregation module A1 can differentiate between instantaneous and periodic data, and proceeds to aggregate the periodic data of the data messages 410 that it receives within a defined aggregation period into a single data message. The length of the aggregation period may be defined according to network policy set by a network administrator and that may be stored in the policy store 450. In certain embodiments, the aggregation period can be determined using an algorithm. The policy checker 440 will ensure the defined aggregation period in the policy store 450 may be correctly applied to aggregate the data messages 410 by the aggregation module A1. The aggregated single data message from each defined aggregation period may be stored in the state store 430, for forwarding to the change detection module A2.

As an example of how the aggregation module A1 may aggregate data messages into a single data message, the aggregation module A1 may receive for example, 10080 data messages 410 from the first device in a period of 1 week. The aggregation period may be defined as 5 minutes according to network policy set by a network administrator and stored in the policy store 450. The aggregation module A1 will then divides the 1 week period into aggregation periods having time intervals of 5 minutes each, and aggregate the data messages 410 that are received within each of those aggregation periods into a single data message. As a result, the 10080 data messages 410 received by the aggregation module A1 can be aggregated to 2016 single data messages.

FIG. 5 illustrates a flowchart 500 for an aggregation process performed by the aggregation module A1 of the sub-system 100 to aggregate data messages over a specified aggregation period for the first device. The specified aggregation period may be a time interval that falls between a first specified time and a second specified time. The specified aggregation period may be defined according to network policy set by a network administrator. In certain embodiments, the specified aggregation period may be determined by an algorithm. The specified aggregation period may also be referred to as the current aggregation window. The aggregation module A1 receives data messages from the first device over a first period of time. Block 510 of the flowchart 500 marks the beginning of the aggregation process for a data message received by the aggregation module A1 from the first device. In block 512 of the flowchart 500, a timestamp of the data message may be inspected by the aggregation module A1 to determine if the timestamp of the data message is within the current aggregation window. If the timestamp of the data message is determined not to be within the current aggregation window, the data message may be dropped or discarded as shown in block 524 of the flowchart 500. Thereafter, block 526 of the flowchart 500 marks the termination of the aggregation process for the data message.

If in block 512 of the flowchart 500 the timestamp of the data message is determined to be within the current aggregation window, the data message may be included in a collection of data messages that have already been determined to be within the current aggregation window. An aggregation function may be executed by the aggregation module A1 on the collection of data messages as shown in block 514 of the flowchart 500, in order to aggregate the collection of data messages into a single aggregated data message. The single aggregated data message may be stored temporarily in a cache (e.g., the state store 430 described previously in FIG. 4). In block 516 of the flowchart 500, the aggregation module A1 determines if the current aggregation window is closed. If the current aggregation window is not closed, the aggregation module A1 will await the possible receipt of further data messages from the first device. If the current aggregation window is closed, the aggregation module A1 will forward the single aggregated data message downstream (e.g., to the change detection module A2) as shown in block 518 of the flowchart 500. The cache (e.g., the state store 430) may be cleared as shown in block 520 of flowchart 500. Thereafter, block 522 of the flowchart 500 marks the termination of the aggregation process to aggregate data messages over the current aggregation window for the first device.

FIG. 6 illustrates a tabular view of the aggregation process performed by the aggregation module A1 that is described in FIGS. 4 and 5. The table 600 includes a first time column 610 and a first data column 620. The first time column 610 shows timestamps that indicate specific moments in time in which corresponding data messages from the first device are received by the aggregation module A1. The first data column 620 denotes a representation of the data messages received by the aggregation module A1. Each representation of a data message in the first data column 620 may be associated with a corresponding timestamp in the first time column 610. The timestamps in the first time column 610 are organized in terms of intervals that span defined aggregation periods. For example, a time TO represents an initial moment in time at the beginning of a first defined aggregation period, and a time Tn represents a moment in time at the end of the first defined aggregation period, wherein a span of time extending from the time TO to the time Tn is the length of the first defined aggregation period. A time Ti (e.g., time T1, time T2, etc.) may represent individual timestamps within the first defined aggregation period. In this way, the data messages received by the aggregation module A1 from the time TO to the time Tn are classified as having been received during the first defined aggregation period. This organization of the timestamps may continue further such that the time Tn+1 may also represent an initial moment in time at the beginning of a second defined aggregation period, and a time T2$n$ represents a moment in time at the end of the second defined aggregation period, wherein a span of time extending from the time Tn+1 to the time T2$n$ is the length of the second defined aggregation period. A time Tj (e.g., time Tn+1, time Tn+2, etc.) may represent individual timestamps within the second defined aggregation period. In this way, the data messages received by the aggregation module A1 from the time Tn+1 to the time T2$n$ are classified as having been received during the second defined aggregation period. The pattern of organization continues in a similar manner for all further timestamps in which corresponding data messages from the first device are received by the aggregation module A1.

An aggregation function may be executed by the aggregation module A1 on the data messages received by the aggregation module A1, such that the data messages received during each defined aggregation period (e.g., the first defined aggregation period, the second defined aggregation period, etc.) are aggregated into a single data message. The table 600 includes a second time column 630 and a second data column 640. The second time column 630 shows the moment in time at the end (e.g., Tn, T2n, etc.) of each of the defined aggregation periods in which corresponding data messages received during that defined aggregation period were aggregated to a corresponding single data message. The second data column 640 denotes a representation of the aggregated single data messages after the aggregation function is executed by the aggregation module A1. Each representation of an aggregated single data message in the second data column 640 may be associated with a corresponding defined aggregation period in the second time column 630.

Figure 7:
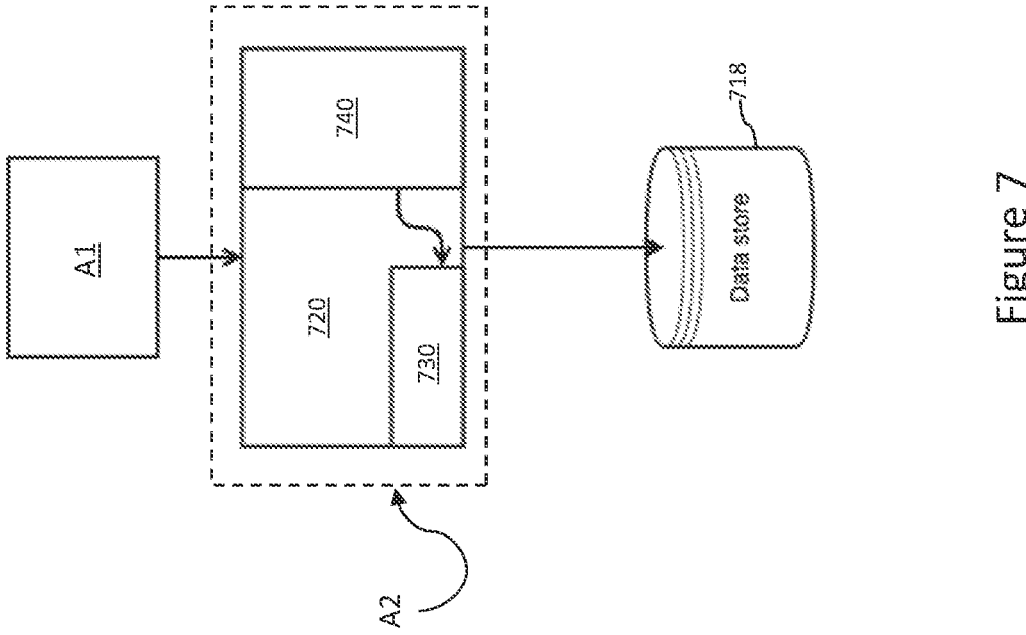
FIG. 7 illustrates a block diagram of a change detection module of the sub-system of the NMS, according to certain embodiments.
Figure 8:
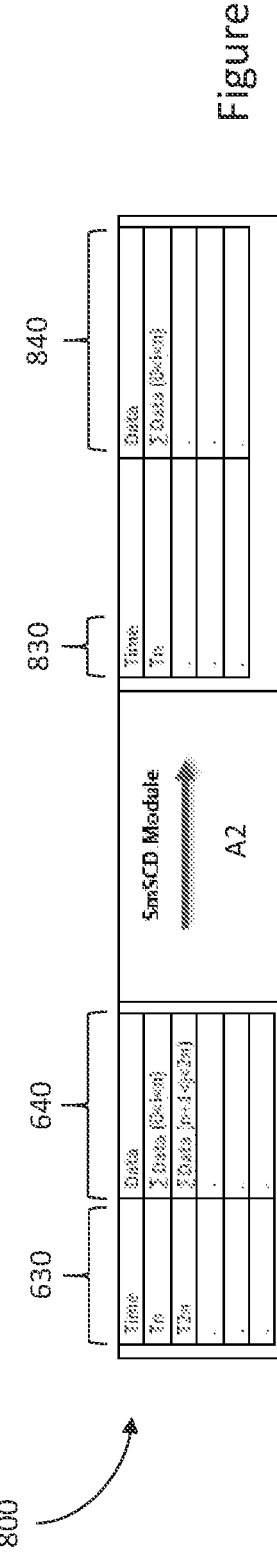
FIG. 8 illustrates a tabular view of a comparison process performed by the change detection module, according to certain embodiments.

FIG. 7 illustrates a block diagram of the change detection module A2 of the sub-system 100 that was described previously in FIGS. 1 through 3, according to certain embodiments. FIG. 8 illustrates a tabular view of the comparison process performed by the change detection module A2 that is described in FIG. 7. In FIG. 7, the change detection module A2 is described in the context of being applied to the first device of the large-scale network. In certain embodiments, a respective change detection module A2 may be applied to more than one client (e.g., devices, or the like) or network element of the large-scale network. The change detection module A2 may also be referred to subsequently as a smart state change detection module (SmSCD) and may include a core module 720 that may be responsible for data processing logic and coordination of various tasks. The core module 720 may interact with other modules of the sub-system 100 to ensure the smooth operation of the large-scale network. The change detection module A2 may include a state store 730 that maintains and organizes the current state or condition of the most recently received aggregated data message from the aggregation module A1.

The change detection module A2 may also include a delta comparator 740 that may be responsible for comparing each aggregated data message received from the aggregation module A1 to the most recently stored data in a data store 718. The data store 718 may be similar to the data store 218 that was described previously in FIG. 2. The delta comparator 740 therefore compares the most recently stored data in the data store 718 that is from a preceding aggregation period to the aggregated data message (whose current state or condition may be maintained in the state store 730) received from the aggregation module A1. The aggregated data message from the aggregation period that is currently being compared may be published (also referred to as stored) to the data store 718 if the aggregated data message is different from the stored data already in the data store 718, or if there is no data present in the data store 718. In certain embodiments, a user can define the comparison parameters or policy of the delta comparator 740, in order to exclude certain characteristics of the aggregated data message from the comparison.

FIG. 8 illustrates a tabular view of the comparison process performed by the change detection module A2 that is described in FIG. 7. The table 800 includes the second time column 630 and the second data column 640 that were described previously in FIG. 6. For example, the second time column 630 shows the moment in time at the end (e.g., Tn, T2n, etc.) of each of the defined aggregation periods in which corresponding data messages received during that defined aggregation period were aggregated to a corresponding single data message by the aggregation module A1. The second data column 640 denotes a representation of the aggregated single data messages after the aggregation function is executed by the aggregation module A1. Each representation of an aggregated single data message in the second data column 640 is associated with a corresponding defined aggregation period in the second time column 630.

A comparison may be performed of each aggregated single data message in the second data column 640 to the most recently stored data in the data store 718 (described previously in FIG. 7), the comparison being performed by the change detection module A2. The most recently stored data is from a previous aggregation period as compared to the aggregation period of the aggregated single data message that it is being compared to. The aggregated single data message from the aggregation period that is currently being compared may be published (also referred to as stored) to the data store 718 if the aggregated single data message is different from the stored data already in the data store 718, or if there is no data present in the data store 718.

The table 800 includes a third time column 830. The third time column 830 shows the moment in time at the end (e.g., Tn, T2n, etc.) of each defined aggregation period in which a corresponding aggregated single data message was published to the data store 718, after the comparison is performed by the change detection module A2. The table 800 includes a third data column 840. The third data column 840 denotes a representation of the aggregated single data messages that are published to the data store 718. Each representation of a stored aggregated single data message in the third data column 840 is associated with a corresponding defined aggregation period in the third time column 830. If an aggregated single data message in the second data column 640 is not stored in the data store 718 after the comparison is performed by the change detection module A2, the aggregated single data message is dropped or discarded, and hence not shown in the third data column 840. In addition, the defined aggregation period that corresponds to the dropped aggregated single data message is also not shown in the third time column 830.

As an example, the aggregation module A1 may forward, for example, 2016 aggregated single data messages to the change detection module A2 in a period of 1 week, in order to be compared to recently stored data in the data store 718. Each defined aggregation period for each aggregated single data message can be for example, 5 minutes. If the change detection module A2 detects a difference between an aggregated single data message and the recently stored data in the data store 718 on average, every 20 minutes, then only 504 aggregated single data messages will be stored in the data store 718. The other aggregated single data messages will be discarded or dropped. This results in a reduction in the volume of data that is stored in the data store 718, and therefore results in a reduction in the amount of data that need to be transmitted within the large-scale network.

Figure 9:
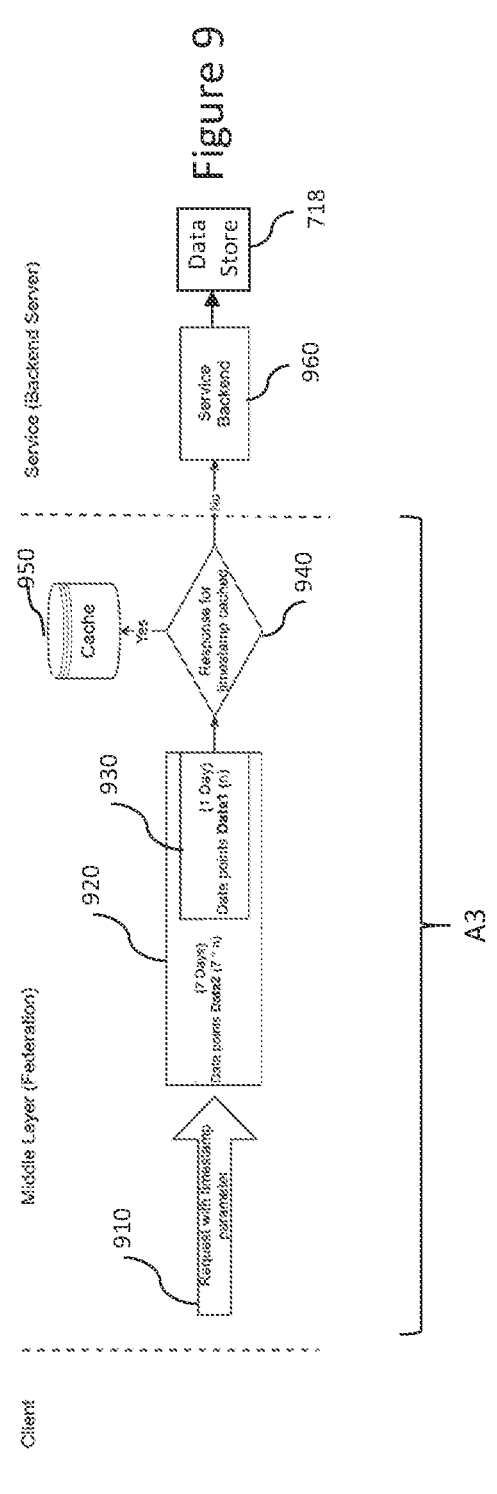
FIG. 9 illustrates a diagram that shows the use of a middle layer cache module to delegate a request to retrieve data, according to certain embodiments.

FIG. 9 illustrates a diagram that shows the use of the middle layer cache module A3 (e.g., a federation layer or a middle layer) to delegate a request to retrieve data, according to certain embodiments. The middle layer cache module A3 is used to delegate requests (e.g., from a client to the first device) through an applicable backend service 960 to retrieve data from a data store (e.g., the data store 718 described previously in FIGS. 7 and 8) at a specific time (e.g., at a specific date and time in the past, or during a specific time frame in the past).

The middle layer cache module A3 may include a cache 950 where responses for past requests are stored. The stored responses in the cache 950 can serve as both a superset and subset for subsequent requests. In this way, the stored data in the cache 950 of the middle layer cache module A3 can be reused if a date and time of a subsequent request to retrieve data is the same as the date and time of a previously fulfilled request to retrieve data from the data store 718. In addition, the stored data in the cache 950 of the middle layer cache module A3 can be reused if a time frame of a subsequent request to retrieve data is fully within or partially within the time frame of a previously fulfilled request to retrieve data from the data store 718. For example, a request 910 may be received from the client to retrieve data 920 from the first device, wherein the data 920 is associated with a set of timestamp parameters. For example, the requested data 920 may span a time frame of 7 days. If each day has n number of data points, then the retrieved data 920 will include 7×n data points. The middle layer cache module A3 will perform a determination process 940 to determine if the response to the request 910 to retrieve the data 920 that is associated with the set of timestamp parameters is already stored in the cache 950. If for example, the data 930 is already stored in the cache 950, the data 930 being a subset of the data 920, and wherein the data 930 spans a time frame of 1 day and includes n data points, then the data 930 will be reused as part of the response to the request 910 received from the client to retrieve the data 920 from the first device. The remaining portions of the data 920 (e.g., spanning a time frame of 6 days, and which include 6×n data points) that were not already stored in the cache 950 are then retrieved from the data store 718 by the backend service 960. In this way, the request 910 from the client to retrieve data 920 from the first device may be fulfilled. Using the cache 950 of the middle layer cache module A3 to retrieve some or all of the requested data 920 rather than the data store 718, results in improved response times and better system performance.

Figures 10, 11:
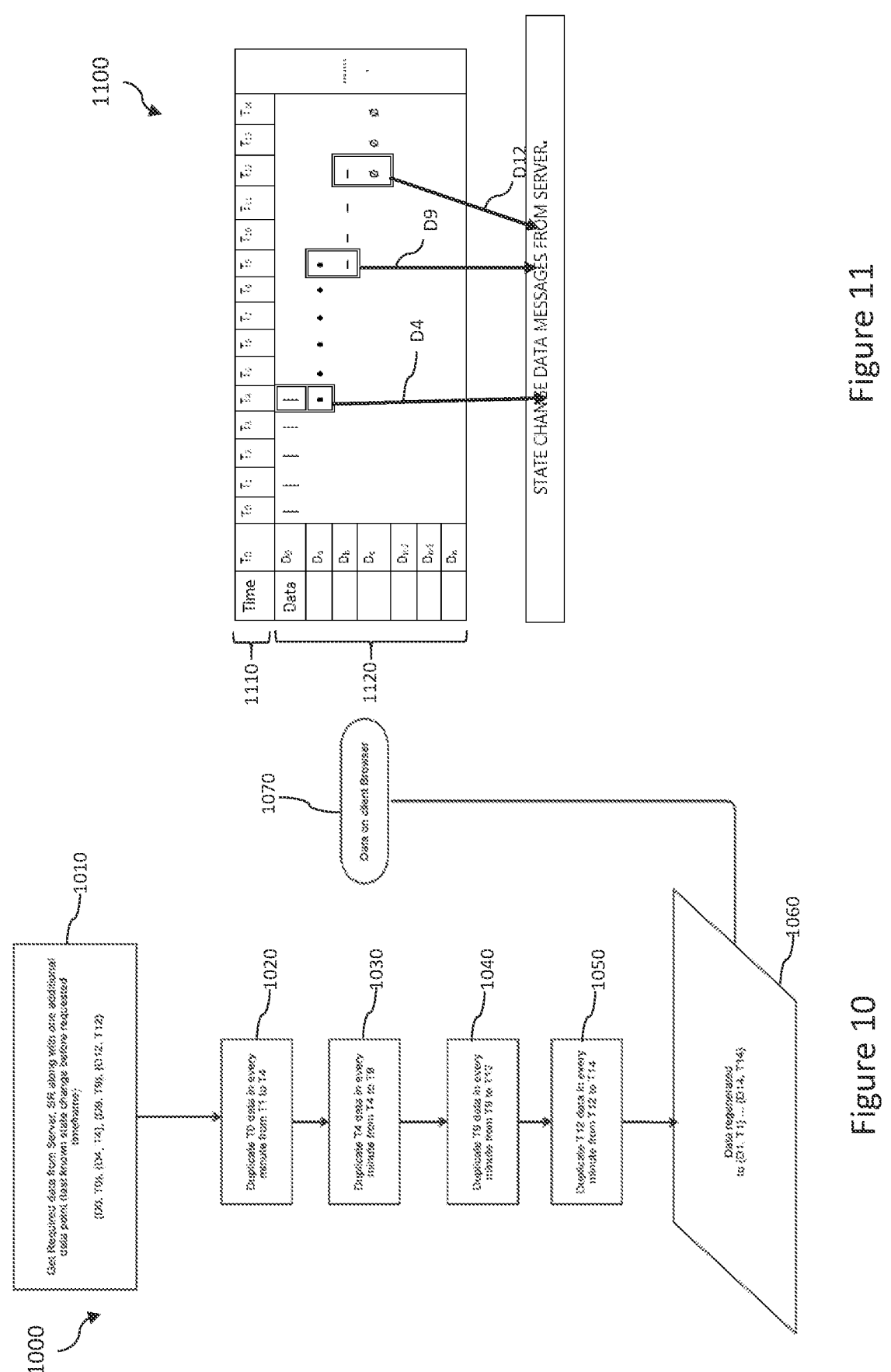
FIG. 10 illustrates a flowchart for a regeneration process performed by a regeneration module of the sub-system of the NMS, according to certain embodiments.
FIG. 11 illustrates an example tabular view of the regeneration process performed by the regeneration module, according to certain embodiments.

FIG. 10 illustrates a flowchart 1000 for a regeneration process performed by the regeneration module A4 of the sub-system 100 to regenerate some, and potentially all, of a state timeline, according to certain embodiments. FIG. 11 illustrates a tabular view of the regeneration process performed by the regeneration module A4 that is described in FIG. 10. The regeneration process shown in FIG. 10 regenerates some, and potentially all, of a state timeline using the stored data in the data store 718 (described previously in FIGS. 7 through 9), and/or one or more caches (e.g., the cache 950 described previously in FIG. 9) of the sub-system 100. In block 1010 of the flowchart 1000, in response to a user request to retrieve data relating to the first device that is within a specific time frame in the past, stored data in the data store 718, and/or the cache 950 may be retrieved using the middle layer cache module A3 as described previously in FIG. 9. The retrieved data will include first data points that correspond to respective state changes that happened during the specific time frame requested. In addition, the retrieved data will also include the corresponding timestamps for each of the first data points at which the state changes happened.

As an example, it may be desired to regenerate (also referred to as repopulate) a state timeline that comprises a dataset that includes a series of data values denoted by Di (e.g., data values D1-D14), wherein each data value corresponds to a specific timestamp represented by Ti (e.g., times T1-T14). If for example, just 3 state changes happened during the specific time frame requested at a time T4, a time T9, and a time T12, then three corresponding data values, for example, a data value D4, a data value D9, and a data value D12, are retrieved from the data store 718 and/or the cache 950. In addition, an additional first data point that corresponds to a last known state change that happened prior to the specific time frame requested is also retrieved. As an example, the additional first data point may have a data value DO that corresponds to a time TO. Further, in block 1010 of the flowchart 1000, the retrieved first data points are then sent to the regeneration module A4 that may be on the client-side of the large-scale network.

In block 1020 of the flowchart 1000, the regeneration module A4 duplicates the additional first data point (e.g., the data value D0 which corresponds to the time T0) from the time T1 to the time T4. In block 1030 of the flowchart 1000, the regeneration module A4 duplicates the data value D4 (corresponding to the time T4) from the time T4 to the time T9. In block 1040 of the flowchart 1000, the regeneration module A4 duplicates the data value D9 (corresponding to the time T9) from the time T9 to the time T12. In block 1050 of the flowchart 1000, the regeneration module A4 duplicates the data value D12 (corresponding to the time T12) from the time T12 to the time T14.

In block 1060 of the flowchart 1000, the first data points (e.g., the data values DO, D4, D9, and D12) and the duplicated data values (also referred to subsequently as second data points) from the blocks 1020, 1030, 1040, and 1050 of the flowchart 1000 are combined together to form the regenerated state timeline that comprises a dataset that includes data values D1-D14, wherein each data value corresponds to a specific timestamp represented by times T1-T14. In block 1070 of the flowchart 1000, the regenerated state timeline is presented to users in a visually understandable format, such as a through a user interface of a client application (e.g., through a web browser, or the like).

FIG. 11 illustrates an example tabular view of the regeneration process performed by the regeneration module A4 that is described in FIG. 10. The table 1100 includes a time row 1110 and a plurality of data rows 1120. The time row 1110 shows timestamps of a regenerated state timeline. For example, the time row 1110 shows the specific timestamps represented by Ti (e.g., times T1-T14 described previously in FIG. 10). Each occupied data row of the plurality of data rows 1120 shows a data value corresponding to a first data point (described previously in FIG. 10) at the corresponding timestamp for the first data point. For example, one or more data rows of the plurality of data rows 1120 may show a corresponding data value (e.g., the data values D4, D9, and D12) for a state change that happened at a corresponding timestamp (e.g., the times T4, T9, and T12). At least one data row of the plurality of data rows 1120 may show a data value (e.g., the data value DO) for a last known state change that happened at a corresponding timestamp (e.g., the time TO) prior to the specific time frame for which data was requested.

Further, as shown in table 1100 of FIG. 11, and as described previously in FIG. 10, the regeneration module A4 duplicates the data value DO (which corresponds to the time T0) from the time T1 to the time T4 along a first row of the plurality of data rows 1120. The regeneration module A4 duplicates the data value D4 (corresponding to the time T4) from the time T4 to the time T9 along a second row of the plurality of data rows 1120. The regeneration module A4 duplicates the data value D9 (corresponding to the time T9) from the time T9 to the time T12 along a third row of the plurality of data rows 1120. The regeneration module A4 duplicates the data value D12 (corresponding to the time T12) from the time T12 to the time T14 along a fourth row of the plurality of data rows 1120. The duplicated data values are also referred to as second data points. Performing the regeneration process using the regeneration module A4 to regenerate some, and potentially all, of a state timeline using the reduced volume of data (e.g., the first data points) allows the entire data spectrum to be potentially filled so as to show the first data points during state changes as well as the second data points between each state change and a subsequent state change. In this way, it is possible to bridge the entire spectrum of data in the timeline requested by the user, potentially with no loss of information to the user.

Although described in connection with an NMS and network monitoring data, it should be understood that the concepts described in this disclosure may be applied to any suitable type of application/environment in which large volumes of data are obtained and for which traversing among various states at various times may be useful.

It should be understood that the systems and methods described in this disclosure may be combined in any suitable manner. In addition, although this disclosure describes or illustrates particular steps or operations as occurring in a particular order, this disclosure contemplates the steps or operations occurring in any suitable order. Moreover, this disclosure contemplates any suitable steps or operations being repeated one or more times in any suitable order. Although this disclosure describes or illustrates particular steps or operations as occurring in sequence, this disclosure contemplates any suitable steps or operations occurring at substantially the same time, where appropriate.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A computer-implemented method, comprising:
aggregating data messages related to a device that are transmitted over a network within a defined aggregation period into a single data message, wherein aggregating the data messages related to the device comprises:
differentiating between first data messages of the data messages that comprise periodic data, and second data messages of the data messages that comprise instantaneous data; and
aggregating only the first data messages into the single data message;
comparing the single data message to previously-aggregated data from a preceding aggregation period stored in a data store to determine whether the single data message differs from the previously-aggregated data;
storing, in response to determining that the single data message differs from the previously-aggregated data, the single data message to the data store; and
regenerating a state timeline of the device using stored data in the data store.

2. The computer-implemented method of claim 1, further comprising delegating, by a middle layer cache module, a request to retrieve data from a specific time in a past time.

3. The computer-implemented method of claim 2, wherein the middle layer cache module comprises a cache that stores responses for past requests to retrieve data.

4. The computer-implemented method of claim 2, wherein the specific time from the past time comprises a specific date and time from the past time, or a specific time frame from the past time.

5. The computer-implemented method of claim 1, wherein regenerating the state timeline of the device using the stored data in the data store is performed at an edge-network device.

6. The computer-implemented method of claim 1, further comprising presenting the regenerated state timeline of the device through a user interface.

7. A computer-implemented method, comprising: receiving data messages over a network in a first time period;
dividing the first time period into a first time interval and a second time interval;
performing a first aggregation to aggregate the data messages that correspond to the first time interval into a first single data message, wherein performing the first aggregation comprises:
differentiating between first data messages of the data messages that comprise periodic data, and second data messages of the data messages that comprise instantaneous data; and
aggregating only the first data messages into the first single data message;
comparing the first single data message to previously-aggregated data from a preceding time interval that is stored in a data store to determine whether the first single data message differs from the previously-aggregated data; and
storing, in response to determining that the first single data message differs from the previously-aggregated data, the first single data message to the data store.

8. The computer-implemented method of claim 7, further comprising:
performing a second aggregation to aggregate the data messages that correspond to the second time interval into a second single data message;
comparing the second single data message to the first single data message from the first time interval that is stored in the data store to determine whether the second single data message differs from the first single data message; and
storing, in response to determining that the second single data message differs from the first single data message, the second single data message to the data store.

9. The computer-implemented method of claim 8, wherein dividing the first time period into the first time interval and the second time interval, the first aggregation, and the second aggregation are performed using the aggregation module.

10. The computer-implemented method of claim 7, further comprising delegating, by a middle layer cache module, a first request to retrieve data from a specific time in a past time.

11. The computer-implemented method of claim 10, further comprising determining whether a response to the first request to retrieve the data is already stored in a cache of the middle layer cache module.

12. The computer-implemented method of claim 11, further comprising retrieving, in response to determining that the response to the first request to retrieve the data is already stored in the cache of the middle layer cache module, the requested data from the cache of the middle layer cache module.

13. The computer-implemented method of claim 11, further comprising retrieving, in response to determining that the response to the first request to retrieve the data is not already stored in the cache of the middle layer cache module, the requested data from the data store.

14. A system, comprising:

one or more processors; and one or more non-transitory computer-readable storage media storing programming for execution by the one or more processors, the programming comprising instructions to:

aggregate data messages related to a device that are transmitted over a network within a defined aggregation period into a single data message, wherein to aggregate the programming comprises instructions to:

differentiate between first data messages of the data messages that comprise periodic data, and second data messages of the data messages that comprise instantaneous data; and aggregate only the first data messages into the single data message;

compare the single data message to previously-aggregated data from a preceding aggregation period stored in a data store to determine whether the single data message differs from the previously-aggregated data;

store, in response to determining that the single data message differs from the previously-aggregated data, the single data message to the data store; and regenerate a state timeline of the device using stored data in the data store.

15. The system of claim 14, wherein the programming comprises further instructions to:

delegate a request to retrieve data from a specific time in a past time.

16. The system of claim 15, wherein the specific time from the past time comprises a specific date and time from the past time, or a specific time frame from the past time.

17. The system of claim 14, wherein the programming comprises further instructions to present the regenerated state timeline of the device through a user interface.

18. The system of claim 14, further comprising a policy store that is used to store a network policy that defines a length of the defined aggregation period.

\* \* \* \* \*